Dec. 13, 1932.    H. T. HUNTER    1,890,991
FORMING MEANS FOR COOKING APPARATUS
Original Filed Oct. 10, 1928    2 Sheets-Sheet 1
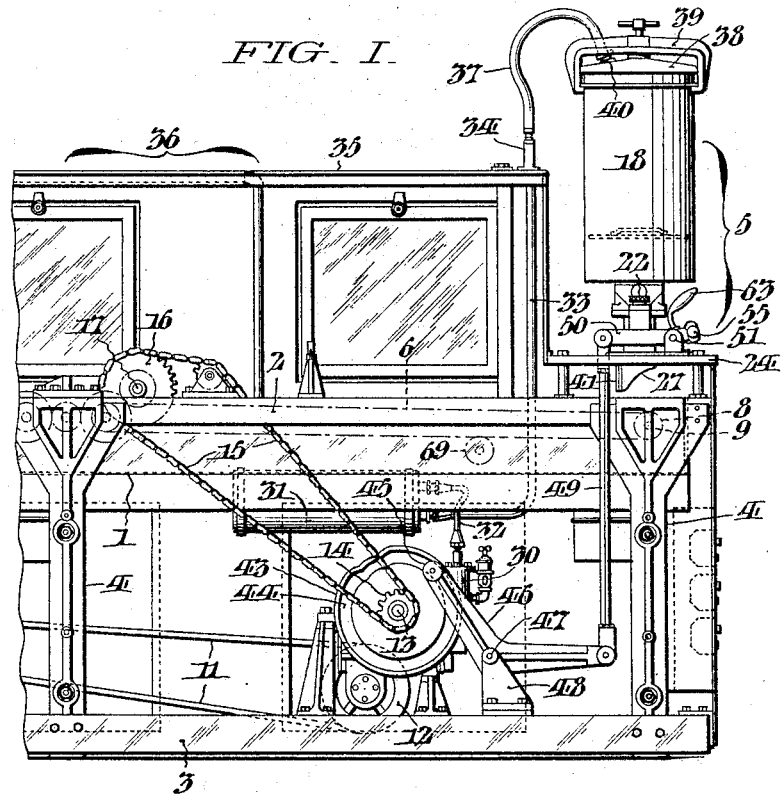
FIG. I.
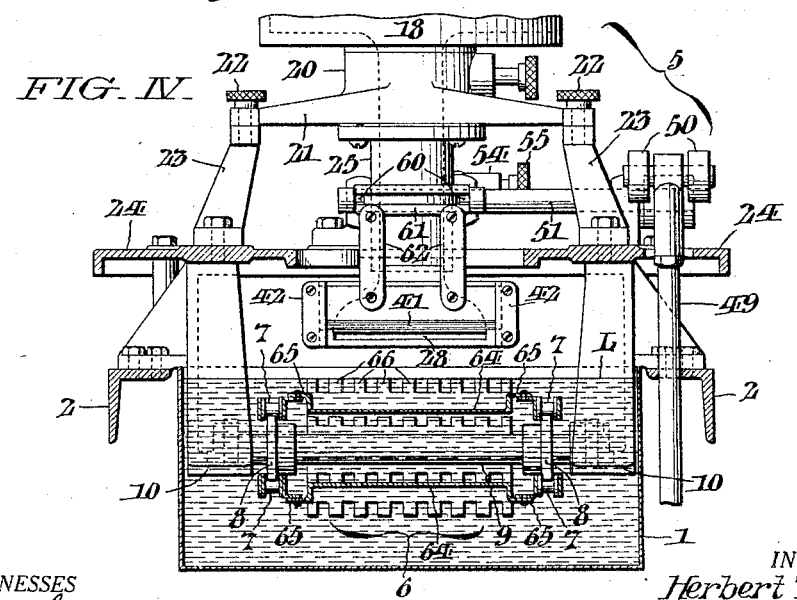
FIG. IV.
WITNESSES
INVENTOR.
Herbert T. Hunter,
BY
ATTORNEY.

Dec. 13, 1932.     H. T. HUNTER     1,890,991
FORMING MEANS FOR COOKING APPARATUS
Original Filed Oct. 10, 1928    2 Sheets-Sheet 2
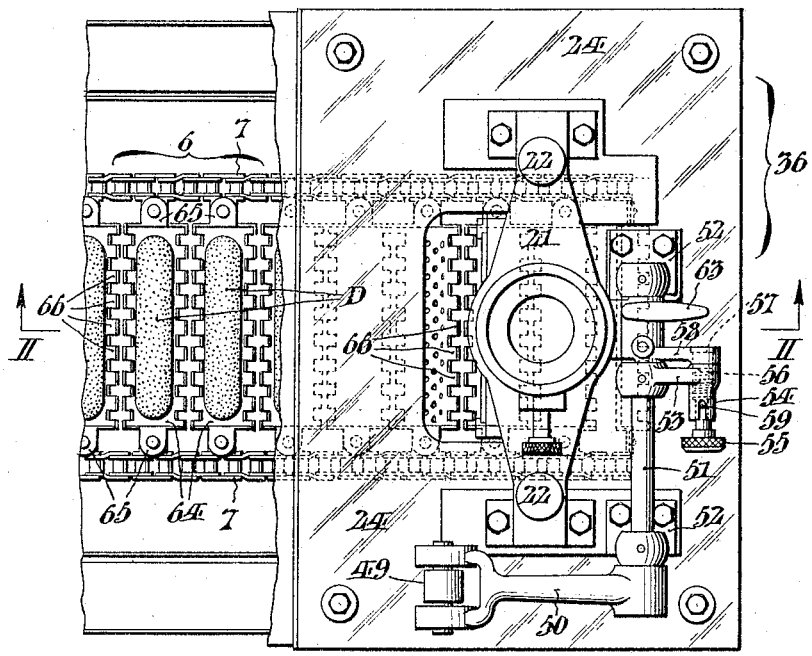
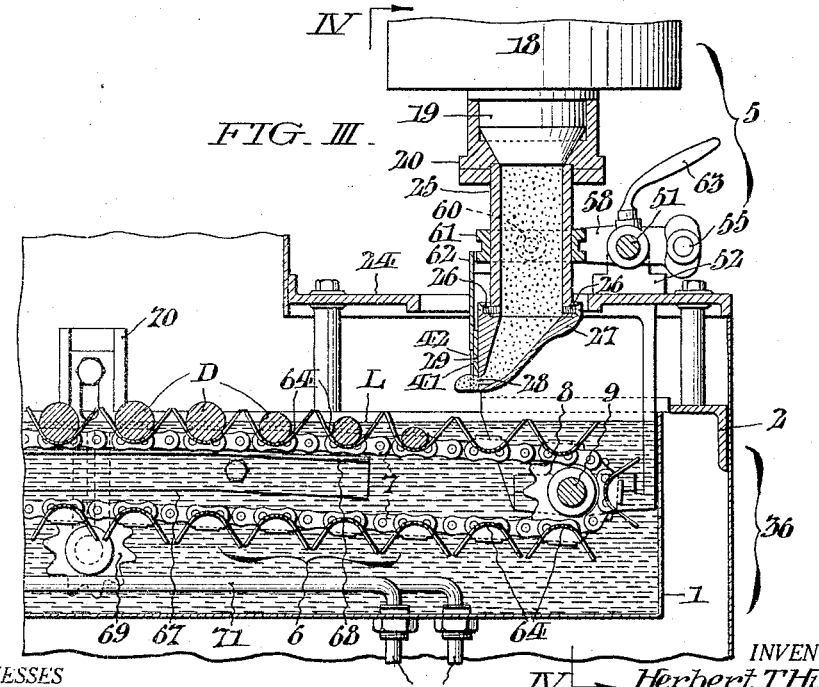
INVENTOR.
Herbert T. Hunter,
BY
ATTORNEY.
WITNESSES Patented Dec. 13, 1932

1,890,991

UNITED STATES PATENT OFFICE

HERBERT T. HUNTER, OF BALTIMORE, MARYLAND, ASSIGNOR TO DOUGHNUT MACHINE CORPORATION, OF NEW YORK, N. Y., A CORPORATION OF NEW YORK

FORMING MEANS FOR COOKING APPARATUS

Original application filed October 10, 1928, Serial No. 311,609. Divided and this application filed February 5, 1931. Serial No. 513,603.

This invention relates generally to cooking apparatus in which hot liquor is employed as the cooking medium, and it has more particular reference to apparatus for cooking articles such as doughnuts of "stick" formation with hot grease or oil. Specifically the present subject-matter is a "division" from my co-pending application for patent filed October 10, 1928, under Serial Number 311,609, which matured into Patent No. 1,814,930, dated July 14, 1931.

In connection with apparatus of the kind referred to, I aim to enable, automatically and under absolutely sanitary conditions, continuous and rapid mass production of stick doughnuts or similar articles with assurance of uniformity in their size and shape, thorough cooking and even browning of their surfaces.

How the foregoing important and other objects can be readily realized in practice will be manifest from the detailed description which follows of the typical embodiment shown in the attached drawings.

Fig. I is a fragmentary side elevation of a cooking apparatus including my improved means whereby raw articles are formed from dough.

Fig. II is a plan view of the same with parts removed in order to better illustrate otherwise hidden features.

Fig. III is a fragmentary longitudinal section taken approximately as indicated by the arrows III—III in the preceding illustration; and, Fig. IV is a fragmentary cross section taken as indicated by the arrows IV—IV in Fig. III, and showing the means whereby the raw articles are formed from dough and released to drop into cooking liquor.

As herein shown, the cooking apparatus of my invention comprises an elongated shallow receptacle 1 for cooking liquor conventionally indicated at L, said receptacle being in the present instance fashioned to elongated rectangular configuration from sheet metal with its bottom sloped slightly so as to drain toward the left-hand or delivery end. The receptacle 1 is suitably supported at a convenient elevation from the floor by a frame embodying upper and lower horizontals 2, 3 and opposite side verticals 4. Located at the receiving or right-hand (Fig. I) end of the apparatus is my novel means 5 for releasing elongated formations D of dough or plastic to drop horizontally into the cooking liquor L in a position transversely of the receptacle 1. The formations D so released are conveyed along a portion of the receptacle 1, at the level of the liquor L therein in definite separation and under restraint against turning over by a progressing means having the form of a conveyor 6. This conveyor 6 comprises side chains 7, which run over end sprockets 8 secured in pairs to a transverse shaft 9 having journal support in bearings 10 bolted to the upper horizontals 2 of the machine frame.

The apparatus is conveniently driven by an electric motor—not shown—located in the lower part of the receptacle supporting frame, said motor being connected by a belt 11 with a speed reduction gear device 12 wherefrom power is in turn transmitted to a transverse jack shaft 13. At one end, this jack shaft 13 carries a sprocket pinion 14 which is coordinated by a chain 15 with a sprocket wheel 16 on a transverse shaft 17 extending centrally over the cooking receptacle 1, said shaft having journal support in suitable bearings.

The forming mechanism 5 comprises a dough magazine 18 having a depending axial outlet 19 at the bottom, which outlet is tapered, as shown, to fit the correspondingly configured seat in the central boss 20 of a supporting bridge piece 21. This bridge piece 21 is removably secured by thumb screws 22, at opposite ends, to brackets 23 upstanding from a plate 24 that forms a cover over the receiving end of the receptacle 1. Bolted to the underside of the boss 20 of the bridge piece 21 is a coaxial cylindrical extension neck 25 whereto it is in turn secured at the lower end, by screws 26—Fig. III, a rectangular outlet fitting 27 which is disposed transversely of the cooking receptacle 1 and has an elongated lateral horizontally disposed die opening 28 in its vertical face 29 at a level above that of the liquor

L in said receptacle. The dough is forced from the magazine 18 by air under pressure generated by a compressing system which includes a pump 30—Fig. I—adapted to be driven from the speed reduction gear device 12 and delivering into an equalizing tank 31 through a pipe 32. From the equalizing tank 31 the air is conducted, via a pipe 33, to a fitting 34 mounted on the roof 35 of the casing 36 enclosing the apparatus. This fitting 34 affords connection for a flexible tube 37 delivering into the top of the dough magazine 18. As shown in Fig. I, the magazine 18 has a removable cover 38 which is held in place by a yoke clamp 39 and provided with a nipple 40 for coupling of the flexible tube 37. To sever the extrusion from the die outlet opening 28 in producing the individual formations D of raw dough, I provide an intermittently movable cutter blade 41 which is guided at the ends for up and down sliding movement over the frontal face 29 of the fitting 27, by slideways 42—Fig. IV. The actuating connections for the cutter blade 41 include a grooved cam 43—Fig. I—mounted on the jack shaft 13 alongside the sprocket pinion 14. This cam 43 has a face groove 44 to engage a roller 45 on one extremity of a bell crank lever 46 with fulcrum support at 47 on a bracket 48 bolted to one of the lower frame horizontals 3. The other extremity of the bell crank lever 46 is coordinated, by means of a link 49, with an arm 50 fast to a rock shaft 51 which is journaled in bearing lugs 52 upstanding from the cover plate 24 at the receiving end of the machine, see Figs. II and IV also. Pinned to the rock shaft 51 is still another arm 53 carrying in its terminal boss 54, a clutch pin 55 which is normally urged inwards by a spring 56—Fig. II—to engage an aperture 57 in a cutter operating arm 58 loosely mounted on the shaft 51. By drawing the clutch pin 55 outward and giving it a slight rotation to bring a laterally projecting lug 59 thereof into engagement with the outer face of the boss 54, said pin is held retracted with the operating arm 58 uncoupled. The forming means 5 can thus be rendered idle without necessity for stopping the apparatus as a whole. The forward extremity of the operating arm 58 is clevised and has inwardly projecting lugs 60 to engage a circumferentially grooved collar 61 which is slidable up and down on the extension neck 25. A pair of straps 62 serve to connect the cutting blade 41 with the collar 61, as shown in Figs. III and IV. By this arrangement it will be seen that with every revolution of the rotary cam 43, the cutter blade 41 will be reciprocated vertically to sever dough extruded through the outlet opening 28 during a previous period of rest, the size of the extrusions or formations D being regulatable by varying the pressure in the air system through suitable means not shown. To enable movement of the cutter blade 41 to align the clutch pin 55 correctly with the aperture 57, and for the purpose of manual operation of said cutter blade in trials for size, the operating arm 58 is equipped with a handle 63, shown in Figs. II and III. The extrusions D released by the forming means 5 in the manner just described, drop horizontally into the liquor L within the cooking receptacle 1 and are received within pockets 64 extending transversely of the side chains 7 of the progressing conveyor 5—the timing of said conveyor and that of the forming means 5 being such that one of the pockets 64 is presented at each operation of said forming means. The pockets 64 are fashioned to trough configuration from sheet metal and provided at their ends with pierced ears or tabs 65 for attachment to corresponding opposite links of the chains 7 by means of screws or other suitable fastening means. The pockets 64 are moreover perforated as shown to permit free circulation of the cooking liquor L about the formations D accommodated within them, as well as with edge notches 66 at intervals for a purpose hereinafter explained. From Fig. III it is to be particularly noted that the sprocket wheel shaft 9 is somewhat below the normal level of the liquor L and that guides 67 are provided to support the upper runs of the conveyor chains 7, said guides having an inclined portion at 68. As a consequence, in moving from the sprocket wheels 8 to the guides 67, the pockets 64 of the conveyor 6 travel upward at a slight inclination. Thus at the point of reception, the bottoms of the pockets 64 are at a level well below the surface of the cooking liquor L so that the several formations D are entirely submerged for a few seconds initially, while its fall is broken through contact with the l:quor L rather than the pockets 64 with avoidance of possible deformation. On the other hand, in moving along the guides 67, the upper run of the conveyor is maintained at a level such that the formation D within the pockets 64 are supported from beneath and thereby held against turning over during the initial stage of the cooking. As a consequence of circulation of the cooking liquor L through the perforations of the pockets 64, the lower halves of the formations D are subjected to the action of said liquor and thereby cooked and browned when they reach the opposite terminus of the conveyor. As a means to maintain the chains 7 of the conveyor 6 taut, I equip the apparatus with idler sprocket pinions 69 which are supported, with capacity for up and down adjustment, by brackets 70 bolted to the top horizontals 2 of the machine frame.

Any suitable means may be employed to heat the liquor L in the receptacle 1, for example, electric coils 71 sheathed within protective tubing and disposed along the bottom of said receptacle beneath the conveyor 6; while the terminals 72 of these coils extend down through the bottom of the receptacle 1 to enable making of the necessary external circuit connections.

In the operation of the apparatus, the raw formations D successively released by the means 5, are received individually within the pockets 64 of the continuously moving conveyor 6, thereby carried in definite separation along the receptacle 1 at the surface of the cooking liquor L while supported against their buoyancy, from turning over. If the size of the raw formations D is either increased or decreased by varying the air pressure maintained on the dough in the magazine 18, the liquor lever is varied up or down so as to prevent floating of the formations D in the conveyor pockets 64 during the initial stage of the cooking process. The apparatus of my invention is thus conducive to mass production, automatically, of stick doughnuts or the like under absolutely sanitary conditions.

Having thus described my invention, I claim:

1. In machines for forming stick doughnuts or the like including a magazine for raw dough, and means for maintaining a suitable head pressure above said dough; the combination of a tubular neck extension terminating in a transverse enlargement having an elongated forming-die outlet, a dough cutter means guided on the neck extension for movement over the die outlet, and mechanism for intermittently operating said cutter means.

2. In machines for forming stick doughnuts or the like including a magazine for raw dough, and means for maintaining a suitable head pressure above said dough; the combination of a tubular neck extensions terminating in a transverse enlargement having an elongate forming-die outlet, a collar slidable up and down on the tubular neck extension, a dough cutter blade supported by straps from said collar and guided over the neck-extensions outlet, and mechanism for intermittently-operating said cutter blade.

3. In machines for forming stick doughnuts or the like including a magazine for raw dough, and means for maintaining a suitable head pressure above said dough; the combination of a tubular neck extension terminating in a transverse enlargement having an elongate forming-die outlet, a circumferentially grooved collar slidable up and down on the tubular neck extension, a cutter blade supported by said collar, a rock-shaft having a cutter-operating arm loosely mounted thereon with its forward extremity engaging the grooved collar, and means whereby said operating arm may be coupled to or disconnected from mechanism adapted to intermittently actuate the cutter blade aforesaid.

4. In machines for forming stick doughnuts or the like including a magazine for raw dough, and means for maintaining a suitable head pressure above said dough; the combination of a tubular neck extension terminating in a transverse enlargement having an elongate forming-die outlet, a circumferentially grooved collar slidable up and down on the tubular neck extension, a cutter blade supported by the grooved collar, a rock-shaft having a cutter-operating arm loosely mounted thereon with its forward extremity engaging the grooved collar, another arm secured to said rock-shaft having clutch means whereby its outer end may be coupled to or disconnected from the cutter operating arm, and mechanism for intermittently operating the cutter blade.

5. In machines for forming stick doughnuts or the like including a magazine for raw dough, and means for maintaining a suitable head pressure above said dough; the combination of a tubular neck extension terminating in a transverse enlargement having an elongate forming-die outlet, a circumferentially grooved collar slidable up and down on the tubular neck extension, a cutter blade supported by the grooved collar, a rock-shaft having a cutter operating arm loosely mounted thereon with its forward extremity engaging the grooved collar, another arm secured to said rock-shaft having a clutch means whereby its outer end may be coupled to or disconnected from the cutter operating arm, mechanism for intermittently operating the cutter blade, and means for manually actuating the cutter-blade when the clutch means aforesaid is in retracted position.

In testimony whereof, I have hereunto signed my name at Ellicott City this 2 day of February, 1931.

HERBERT T. HUNTER.